H. W. GABBETT-FAIRFAX.
AUTOMATIC FIREARM.
APPLICATION FILED APR. 5, 1920.
1,357,857.
Patented Nov. 2, 1920.
7 SHEETS—SHEET 1.
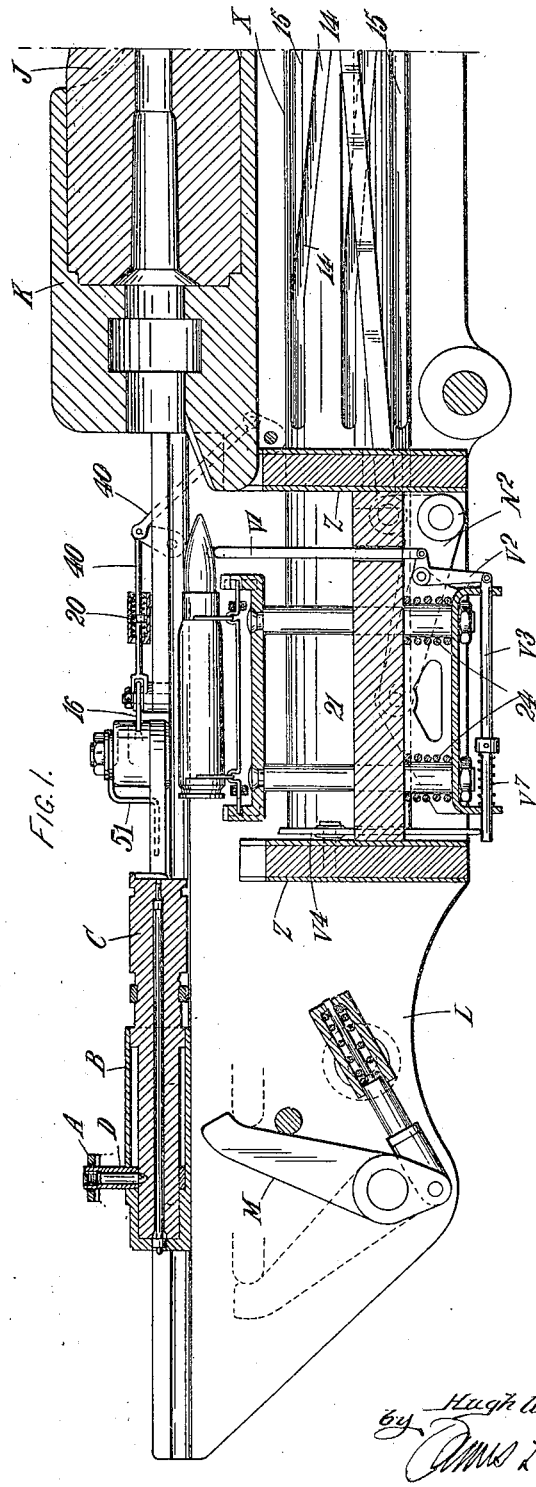

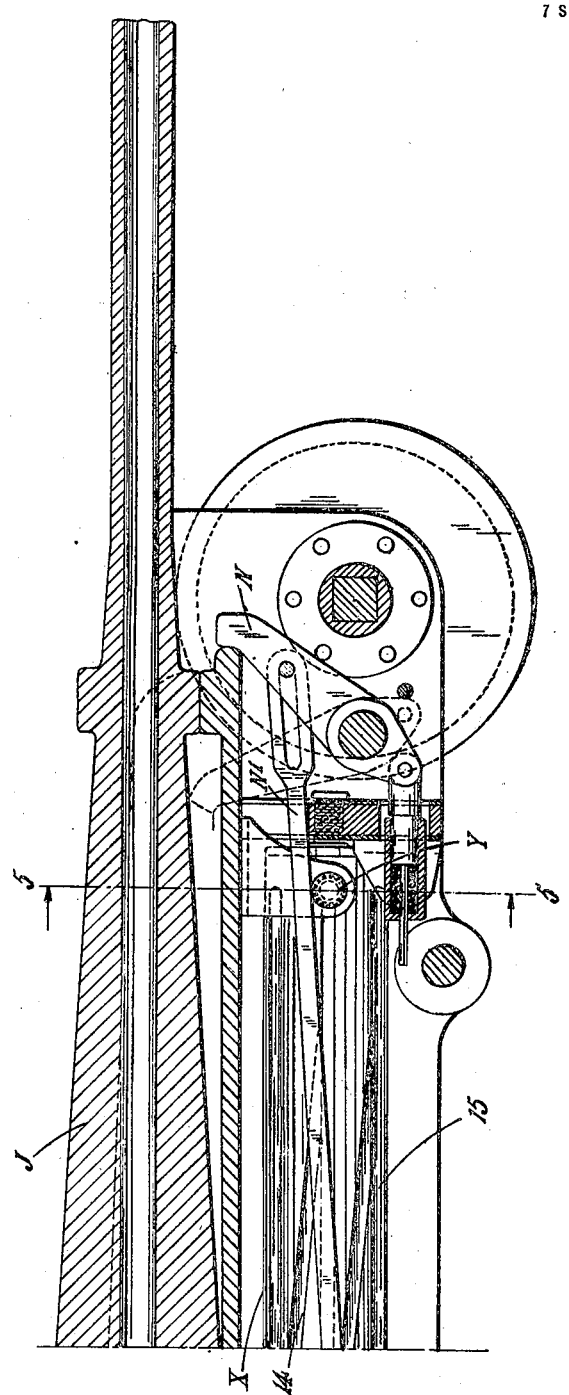

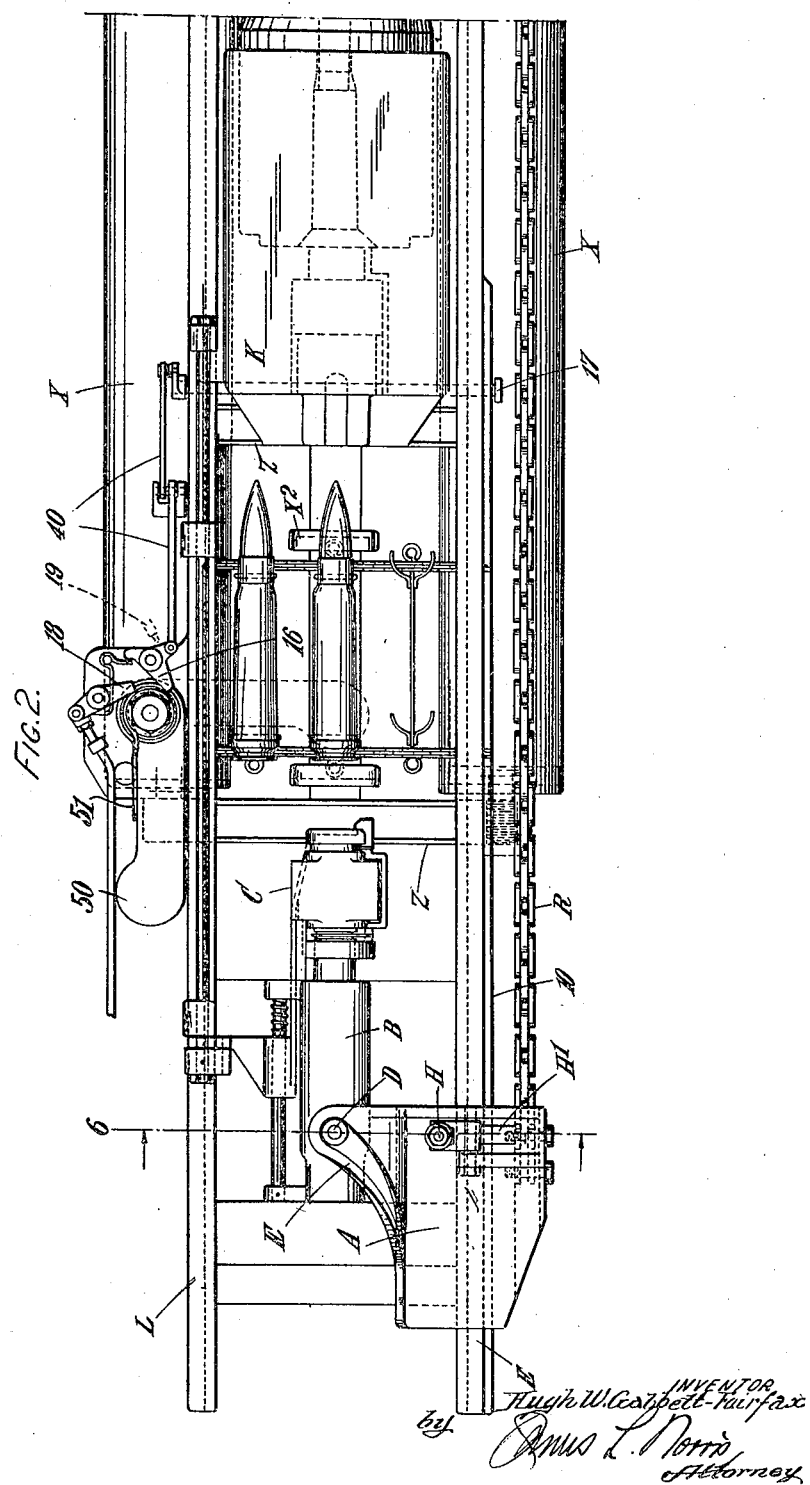

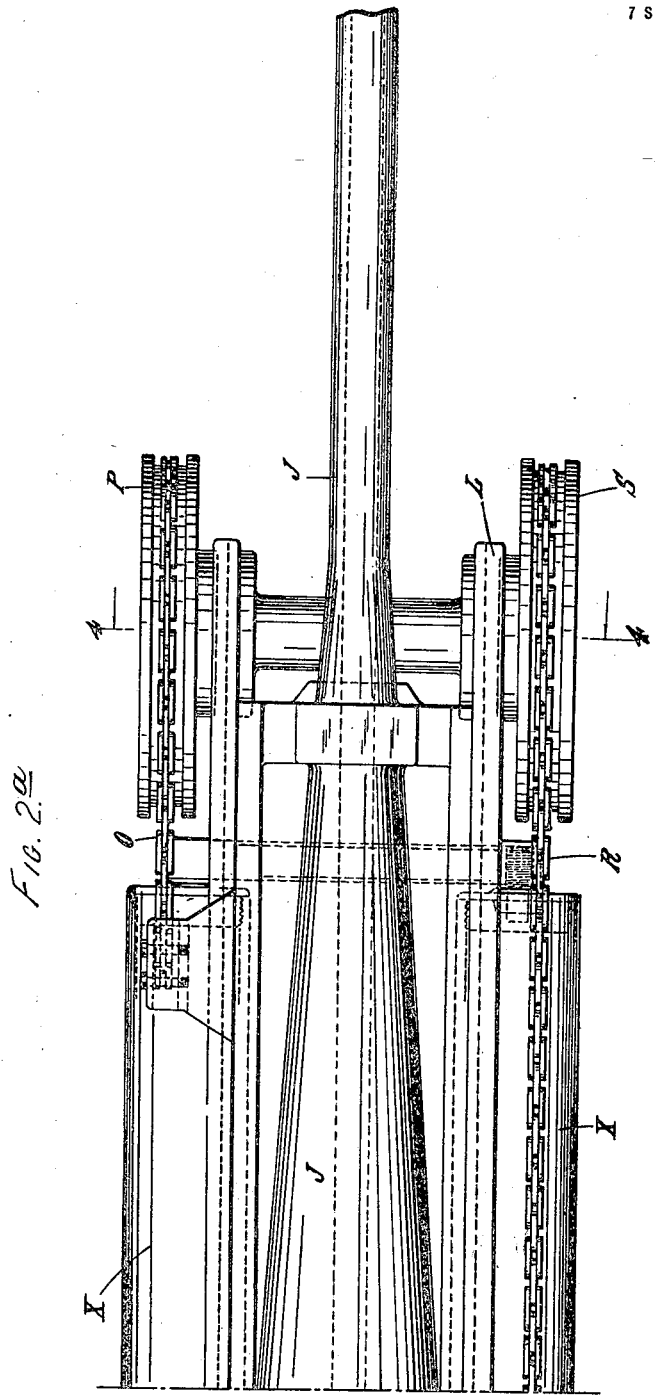

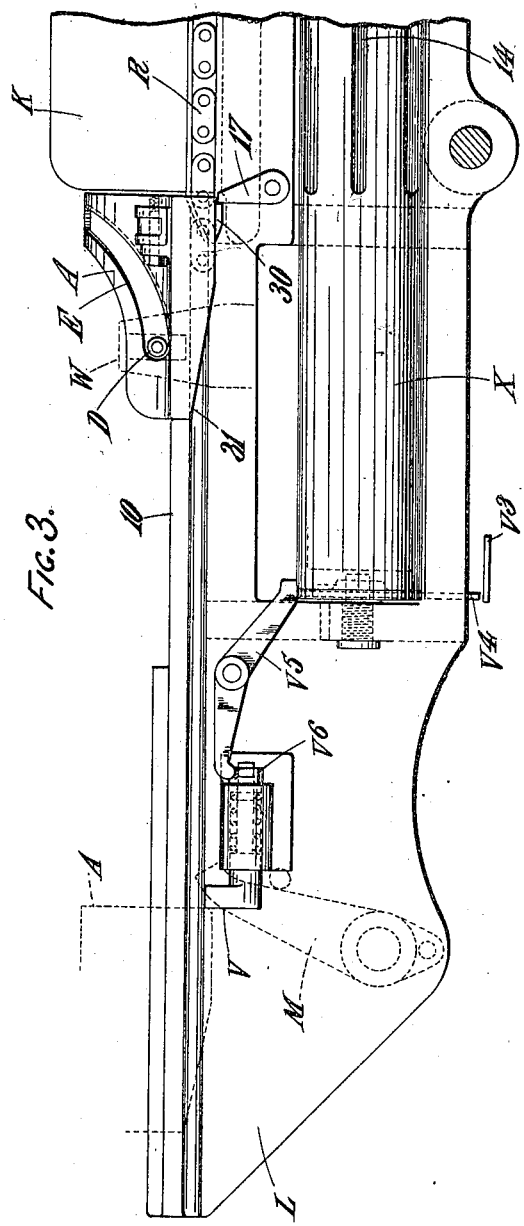

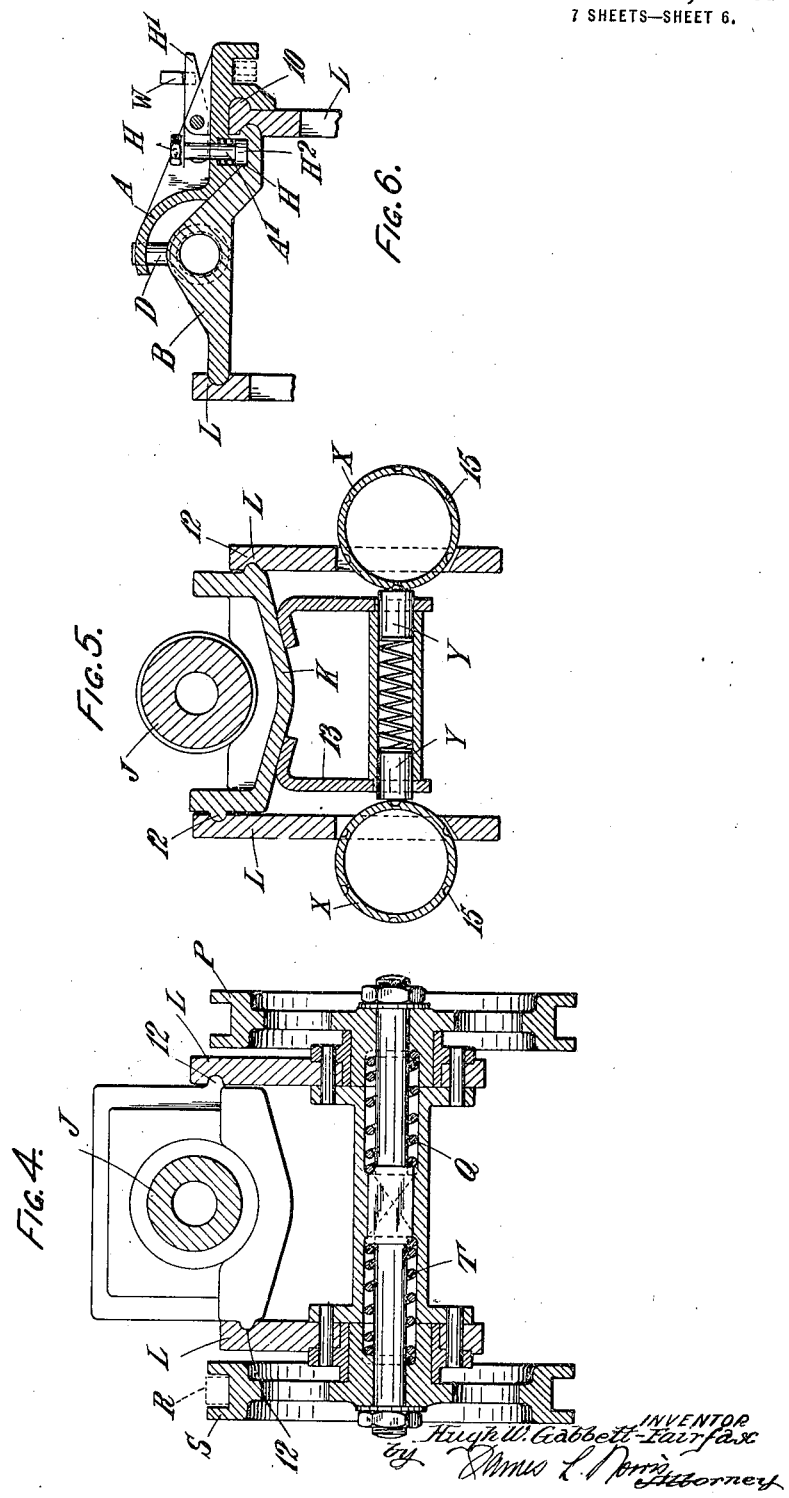

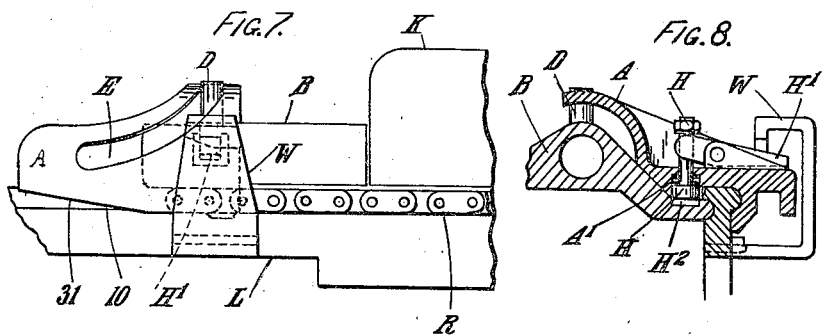
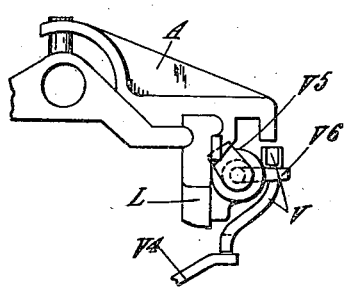
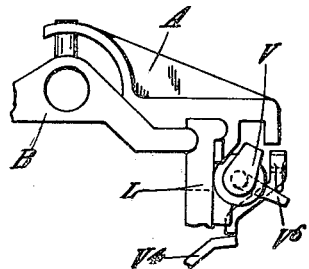

UNITED STATES PATENT OFFICE.

HUGH WILLIAM GABBETT-FAIRFAX, OF LONDON, ENGLAND.

AUTOMATIC FIREARM.

1,357,857.  Specification of Letters Patent.  Patented Nov. 2, 1920.

Application filed April 5, 1920. Serial No. 371,545.

*To all whom it may concern:*

Be it known that I, HUGH WILLIAM GABBETT-FAIRFAX, a subject of the King of Great Britain, residing at London, England, have invented new and useful Improvements in Automatic Firearms, of which the following is a specification.

This invention relates to automatic or semi-automatic machine guns and small arms of the kind in which the gun is operated by the shock of recoil, and in which the breech-block, barrel and bolt recoil while firmly locked together and remain in such relative position during the whole period of recoil or for a considerable part of that period, after which the bolt is unlocked and remains stationary or completes its backward movement while the barrel returns to its forward position of rest. The object of the present invention is to provide a simplified construction together with greater certainty and safety in operation of firearms working on the above principle.

According to this invention the bolt is capable of a limited rotation in a sleeve and has a radial arm controlled and operated by a reciprocating cam plate which is automatically locked to and unlocked from the bolt sleeve as required, a stop or detent serving to time the return motion of the cam plate. The radial arm of the bolt may be guided during the reciprocating motion of the bolt in a slot in the stationary framework of the gun so that it may only be free to rotate during the locking or unlocking of the breech. A further feature of the invention comprises two independent spring controlled drums connected by means of chains or other flexible connections to the breech sleeve and cam plate respectively for returning the recoiling parts to their initial position. This construction allows of delaying the closing of the breech till the feed is complete. The spring drums are wound up simultaneously but quite independently each of the other. Spring buffers or the like used either alone or in conjunction with friction plates are employed to control the reciprocating parts. Moreover one or more grooved drums actuated by spring stops carried in a frame attached to one or other of the recoiling parts is or are provided for feeding the cartridges.

In the accompanying drawings:—

Figures 1 and 1ª, read together, are a longitudinal section of a firearm in which the barrel and bolt are locked together during the whole period of recoil, and having my improvements applied thereto, the breech being shown open.

Figs. 2 and 2ª, read together, are a plan view of the same.

Fig. 3 is a side elevation of the breech end of a firearm showing the cam plate for operating the breech bolt with one form of detents and tripping plate hereinafter described, the breech being closed.

Fig. 4 is a cross section taken on the line 4—4, Fig. 2ª, to show one form of spring control.

Fig. 5 is a cross section through the feed drums on the line 5—5, Fig. 1ª, showing a method of producing rotation in one direction.

Fig. 6 is a section taken on the line 6—6, Fig. 2.

Fig. 7 is a side elevation showing a trip plate and cam plate hereinafter described.

Fig. 8 is a section through the trip plate and cam plate, and is similar to Fig. 6 but showing the parts in a second position.

Fig. 9 is a rear view of the cam plate showing a stop hereinafter described, and Fig. 10 is another view showing the stop in its disengaged position.

Like letters and figures of reference denote corresponding parts in the several figures.

In these drawings, A is a cam plate which slides on a guideway 10 formed in or on one of the side plates L of the gun so that it has a restricted reciprocating motion, and is intermittently connected with and disconnected from the bolt sleeve B or, if desired, with and from the bolt C, and acts on an arm D which is rigidly connected to or is integral with the bolt C. The cam plate A has a cam slot E in which the bolt arm D works, and the cam plate is shown capable of being temporarily connected to and disconnected from the bolt sleeve B by means of a spring locking bolt or pin H. Relative motion between the cam plate and bolt sleeve causes rotation of the bolt C limited by the length of the slot. Alternatively the end of the radial arm D may be made to move in a fixed longitudinal slot in the framework, being free to rotate only when the bolt is driven home in the breech, thus preventing relative motion of the cam plate and bolt sleeve except when actually required, and dispensing with the locking bolt H.

The barrel J is carried in the breech sleeve or body K which is mounted in suitable guideways 12 in the side plates L, L in which the breech sleeve or body slides when the recoil takes place. At the end of the recoil the barrel is brought to rest by the spring buffer M, and another spring buffer N checks the barrel when it is returned to its initial forward position.

A chain O is connected at one end to the breech sleeve and at the other end to a drum P (see Fig. 2$^a$). Said drum is controlled by a spring Q (Fig. 4) which is either coiled or uncoiled, as preferred, when the chain is drawn backward by the recoil of the breech sleeve, and the energy thus stored in the spring is used to return the breech sleeve to its initial position after the recoil is completed, besides serving to check the recoil. A similar arrangement of a chain R connected at one end to the cam plate A and at the other to a drum S which is controlled by a spring T (Fig. 4) serves to return the cam plate after the barrel has gone forward. The drums P and S are capable of rotation independently of each other. By this construction the use of long helical springs for returning the bolt and barrel is avoided. It is desirable that there should be a flexible connection between the cam plate A or breech end and its respective spring-controlled drum such as by a wire rope or by the chain described above, but the connection may be obtained by the use of linked arms spring-controlled, if desired.

A stop V (Figs. 3, 9 and 10) is provided which holds back the cam plate A against the pull of the spring T until said stop is tripped by the feeding of the next cartridge into place ready for loading into the breech. The stop V can rotate in the bracket shown in Figs. 3 and 9, and is normally held against the side plate by the torsional energy stored in the helical spring indicated in Fig. 3. It is also capable of a short forward movement when struck by the advancing cam plate, thus forming a spring buffer. When the next cartridge is fed up the nose of the bullet depresses a plunger V' which acts through a bell crank lever V$^2$, rod V$^3$ and lever V$^4$ to lift the forward end of the lever V$^5$, thus forcing down the rearward end of said lever and rotating the tail lever V$^6$ which is integral with or rigidly attached to the stop V. This swings the head of the stop V out of engagement with the cam plate A and frees the latter as shown in Fig. 10. The cam plate A by its rearward motion pushes the stop V aside by means of its inclined heel 31 (Figs. 3 and 7) and passes over the said stop which rises behind it and prevents the breech from closing till the next cartridge has been fed into the loading position. This arrangement has the effect of stopping the gun with the breech open when an empty space occurs in the belt or when the last cartridge has been fired.

A trip-plate W or other suitable device is also provided to unlock the locking bolt H during the operation of loading and closing the breech. The locking bolt H as shown in Figs. 2, 6 and 8, consists of a pin working vertically in a pocket A' in the cam plate and normally held down by the action of a spring so that its lower end is pressed into a recess H$^2$ in the bolt sleeve B. In this position the cam plate and bolt sleeve are locked together. The pin can be raised clear of the recess by pressing on the tail of a trip lever H'. In the forward motion of the bolt the tail of the lever H' is depressed, as shown in Figs. 7 and 8, when passing under the trip-plate W and the pin is raised, thus unlocking the cam plate from the bolt sleeve. When the cam plate A is drawn forward by the chain R (Figs. 2 and 7) it forces the bolt-arm D to rotate in the cam slot E, thus locking the bolt into the breech. The locking bolt H is now resting on the top of the bolt sleeve B and it remains in such position during the recoil of the breech and bolt; but when the cam plate is held back against the stop V and the barrel and bolt-sleeve go forward, the locking bolt H will drop into the recess H$^2$ as soon as the forward travel of the bolt sleeve B relatively to the cam plate C is complete, the unlocking of the bolt from the breech taking place during this relative movement. The cam plate A is then locked to the bolt sleeve B and both are drawn forward together by the chain R as soon as the stop V is moved aside. Any suitable device which will perform the same locking and unlocking function may be used.

The firearm is provided with feed drums X, X carrying a belt (see Figs. 1 and 2) which brings the cartridges successively into correct position for the forward motion of the breech bolt to sweep them successively out of the belt clips and into the cartridge chamber. The breech sleeve or body K in returning to its initial forward position rotates the feed drums by means of spring pins Y, Y which are carried in a frame 13 rigidly attached to the breech sleeve or body K, and which in the arrangement shown work in a series of inclined grooves 14 formed on the surfaces of the drums which merge near each end into a second series of grooves 15 parallel to the axis of the drums. The said grooves 14, 15 are of varying depth so that the spring pins Y, Y when passing from the inclined grooves to the axial grooves and also from the axial grooves to the inclined grooves, drop from a groove of shallower to a groove of greater depth, thus preventing the studs from retracing their paths and rotating the feed drums backward.

In the construction of the cross frames or diaphragms in the framework of a machine gun I prefer to use flitch plates Z, Z, the outer plate being of metal and the central plate of wood or other suitable material, the object being to secure sufficient strength with the minimum weight.

The firing mechanism is of the ordinary type consisting of a hammer 50, mainspring 51, and sear or sears with a safety attachment, one sear being released automatically by the complete locking of the bolt. In the arrangement shown, the sear 16 is released by the toe 30 of the cam plate A engaging with the trip lever 17 (Fig. 3) and tripping the sear 16 (Fig. 2) through the train of links 40 shown in Figs. 1 and 2. This engagement occurs at the instant of complete locking of the breech.

A second sear 18 may also be provided which is tripped by the pull of the trigger, thus permitting of automatic bursts of fire, the duration of which is controllable by the operator.

In the arrangement shown, the piston 19 (Fig. 2) of a synchronizing apparatus is indicated by dotted lines, the apparatus being of the Constantinesco or any other suitable type, and operating to hold the sear in engagement when necessary, by any suitable means. The piston as shown, and the synchronizing gear generally is only required when the gun is mounted in aircraft of the type in which the gun fires through the propeller. The piston acts by holding the sear 16 in engagement when, and only when, the blade of the propeller is passing before the muzzle of the gun. The fire of the gun is thus prevented from damaging the propeller. A spring connection 20 (Fig. 1) is provided at any suitable point in the train of levers operating the sear 16 so that when the synchronizing piston is holding down the sear 16, the breech can still close without damaging the synchronizer, or breaking the linkwork.

In cases in which the breech sleeve and barrel recoil over the feed mechanism, it will usually be necessary to provide means for raising the cartridge into the proper position for the bolt to load it into the breech after the breech sleeve has gone forward, the belt and cartridges being at other times below the level of the underside of the breech sleeve. For this purpose a lifting carriage 21 is provided which carriage is held down below the clearance line of the breech by the action of springs 24, but is raised by the pull of a link N' acting through a bell crank lever N², the link N' being actuated by the spring buffer N when reaching the end of its travel at such time as the breech sleeve and barrel are reaching their initial position.

Any other suitable method may be employed for conveying the cartridges to their proper position for loading, after the breech sleeve has gone forward.

A further function is performed by the lifting carriage as shown. As the belt feeds across from one drum X to the other a cartridge coming into position in a vertical plane through the axis of the gun depresses the plunger V' which operates through bell crank V² to push plunger V³ to the rear. With plunger V³ in this position it comes into engagement with the release lever V⁴ on the rise of the lifting carriage, and through the auxiliary lever V⁵ rotates the stop V and releases the cam plate.

When an empty space occurs in the cartridge belt, or when the last cartridge is fired, the breech sleeve goes forward raising the lifting carriage, but the plunger V³ has not been driven to the rear because the plunger V' has not been depressed and the plunger V³ is therefore, by the action of its spring V⁷, held out of engagement with the lever V⁴. Consequently the cam plate is not released and the gun stops with the breech open ready for the insertion of another belt. The arrangement just described is only one method of attaining the above result, and any other suitable mechanism may be used.

The functioning is as follows:—Just before firing, the breech sleeve K is in its forward position with a cartridge in the chamber and the bolt C closing the breech and locked into it by locking lugs of the usual pattern. The hammer is cocked, and the breech being closed the sear 16 is tripped, but as the trigger rod connected to the sear 18 has not been pulled the sear 18 is still in engagement, also as the barrel is forward, the spring buffer N is in its extreme forward position and has raised the lifting carriage 21 by the pull of the link N'. On pulling the trigger rod, the sear 18 is tripped and the shot is fired. The shock of recoil drives back the barrel, mounted in the breech sleeve K and bolt C (which are locked together) against the action of the springs Q and T (Fig. 4). The hammer is cocked by the recoil of the bolt sleeve B. The spring buffer N rotates rearwardly actuated by its spring, and frees the link N' which is drawn back by the action of the springs 24, driving the lifting carriage 21 down to its normal position. This allows the recoiling parts to travel over the top of the cartridges and belt.

When the recoiling parts are just being brought to rest by the spring buffer M the inclined heel 31 of the cam plate treads down and passes over the spring stop V which stop rises again in front of the cam plate. On the completion of the recoil movement, the springs Q and T (Fig. 4) assert themselves and draw the breech sleeve and cam plate slightly forward against the stop V. During the recoil, the locking pin H has been out of engagement and when the cam plate reaches the stop V its movement is checked and the breech sleeve and bolt alone go forward forcing the bolt arm D to travel in the slot E of the cam, thus rotating the bolt C and unlocking it.

When the unlocking is complete, the pin H drops into its recess $H^2$, Fig. 6, in the bolt sleeve B, thus locking the cam plate A and sleeve B together, and the breech sleeve is drawn forward by its spring Q (Fig. 4) and chain O. The spent cartridge case is left behind, retained against the face of the bolt by the extractor. During the recoil of the breech sleeve K the spring pins Y, Y (Fig. 5) travel in the axial grooves 15 in the feed drum X, X and no rotation occurs, but in the forward movement of the breech the spring pins Y, Y travel in the inclined grooves 14 and rotate the feed drums, bringing the next cartridge into position in the vertical plane through the axis of the barrel. In the arrangement shown the ejection occurs toward the end of the forward movement of the breech sleeve, but before the lifting carriage is raised.

As the barrel comes to rest, it drives forward the spring buffer N which actuates the rod N' and raises the lifting carriage 21 bringing into the loading position the cartridge which has just been fed up. This cartridge, in being carried by the belt into the vertical plane through the axis of the barrel, has depressed the plunger V' and driven the plunger $V^3$ to the rear, so that when the lifting carriage rises the tail of the plunger $V^3$ engages with the lever $V^4$ and rotates the stop V thus releasing the cam plate A. Said cam plate is then drawn forward by the action of the spring T (Fig. 4) and chain R, and carries the bolt sleeve with it, both being firmly locked together by the pin H. The cartridge which has just been lifted is carried forward and loaded into the breech, and the head of the bolt C enters the breech.

When the travel of the bolt is completed, and it comes to rest against the base of the cartridge in the chamber, the lever H' passes under the tripping plate W (Figs. 3 and 6) and the pin H is unlocked. This permits the cam plate to go forward relatively to the bolt sleeve, and the bolt arm D is rotated in the slot E and locks the bolt. As the cam plate A completes its travel, its toe 30 actuates the lever 17 (Figs. 2 and 3) and trips the sear 16 (Fig. 2), thus completing the cycle of operations. If the trigger is still held back, the next shot is fired automatically and the motion continues until the trigger is released, or until the cartridge belt is empty.

I claim:—

1. A recoil-operated firearm comprising a frame, a barrel, a breech, and a breech bolt, means for guiding said barrel, breech and breech-bolt so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, and a detent for controlling the time of the return motion of said cam-plate.

2. A recoil-operated firearm comprising a frame, a barrel, a breech and a breech-bolt, means for guiding said barrel, breech and breech-bolt so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, a detent for controlling the time of the return motion of said cam-plate, two independent spring-controlled drums, and flexible connections between said drums and the breech sleeve and cam-plate respectively.

3. A recoil-operated firearm comprising a frame, a barrel, a breech, and a breech-bolt, means for guiding said barrel, breech and breech-bolt so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, a detent for controlling the time of the return motion of said cam-plate, spring buffers, and means for connecting said spring buffers and said reciprocating parts.

4. A recoil-operated firearm, comprising a frame, a barrel, a breech, and a breech-bolt, means for guiding said barrel, breech and breech-bolt, so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, a detent for controlling the time of the return motion of said cam-plate, grooved cartridge feed drums pivotally mounted in said frame, a frame attached to one of said recoiling parts, and spring stops carried by said frame and adapted to actuate said feed-drums.

5. A recoil-operated firearm, comprising a frame, a barrel, a breech, and a breech-bolt, means for guiding said barrel, breech and breech-bolt, so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, a detent for controlling the time of the return motion of said cam-plate, and mechanism adapted to bring cartridges from a belt successively into line with the axis of the gun for loading, and means for moving said mechanism automatically out of the path of the recoiling breech.

6. A recoil-operated firearm, comprising a frame, a barrel, a breech, and a breech-bolt, means for guiding said barrel, breech and breech-bolt, so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, a detent for controlling the time of the return motion of said cam-plate, a trigger, firing mechanism comprising two sears, an operative connection between one of said sears and the trigger, and an operative connection between the other sear and the breech.

7. A recoil-operated firearm comprising a frame, a barrel, a breech and a breech-bolt, means for guiding said barrel, breech and breech-bolt so as to be slidable in said frame, a sleeve in which said bolt has a limited freedom of rotation, a radial arm on said bolt, a cam-plate engaging said arm, means for reciprocating said cam-plate, means for locking and unlocking said cam-plate to and from said sleeve, and means for periodically preventing relative motion of said cam-plate and bolt-sleeve.

Dated this eleventh day of March, 1920.

HUGH WILLIAM GABBETT-FAIRFAX.

Witnesses:
   GEORGE H. G. SHEPHERD,
   E. S. W. ADAMS CEBBE.